No. 797,904. PATENTED AUG. 22, 1905.
G. MEYER.
TOW LINE GUIDE FOR TOWING LOCOMOTIVES.
APPLICATION FILED NOV. 22, 1904.

Witnesses
Inventor
Georg Meyer

UNITED STATES PATENT OFFICE.

GEORG MEYER, OF BERLIN, GERMANY, ASSIGNOR TO SIEMENS-SCHUCKERT WERKE GESELLSCHAFT MIT BESCHRÄNKTER HAFTUNG, OF BERLIN, GERMANY.

TOW-LINE GUIDE FOR TOWING LOCOMOTIVES.

No. 797,904. Specification of Letters Patent. Patented Aug. 22, 1905.

Application filed November 22, 1904. Serial No. 233,896.

*To all whom it may concern:*

Be it known that I, GEORG MEYER, a subject of the Emperor of Germany, residing at Berlin, Germany, have invented certain new and useful Improvements in Tow-Line Guides for Towing Locomotives, of which the following is a full, clear, and exact description.

The object of the present invention is to provide a tow-line guide for towing locomotives capable of a greater degree of adjustability than heretofore to meet the varying situations, such as height of bridges, tunnels, and other obstructions.

A further object of my invention is to provide a device of this character which will be not only highly efficient in use and simple of construction, but which will permit of adjustment from the cab of the engineer.

Heretofore a tow-line guide for towing locomotives has been known capable of a vertical adjustment from the engineer's cab for the purpose of adjusting the tow-line so as to pass over any obstacles without stopping the locomotive. The disadvantage existent in these old devices, however, is that difficulties are met with in low tunnels or under low bridges if the guide is made of sufficient length to permit the tow-line to pass over high boats when the shores are low by reason of the non-adjustability of the height of the guide to varying levels.

A tow-line guide constructed in accordance with the present invention is capable of a greater degree of adjustability than those heretofore constructed, and hence permits of the passage of the tow-line over high boats in comparatively low tunnels and under comparatively low bridges.

Such a device is clearly shown in the accompanying drawings and described in the following specification, in which like reference-numerals refer to like parts, and in which—

Figure 1:
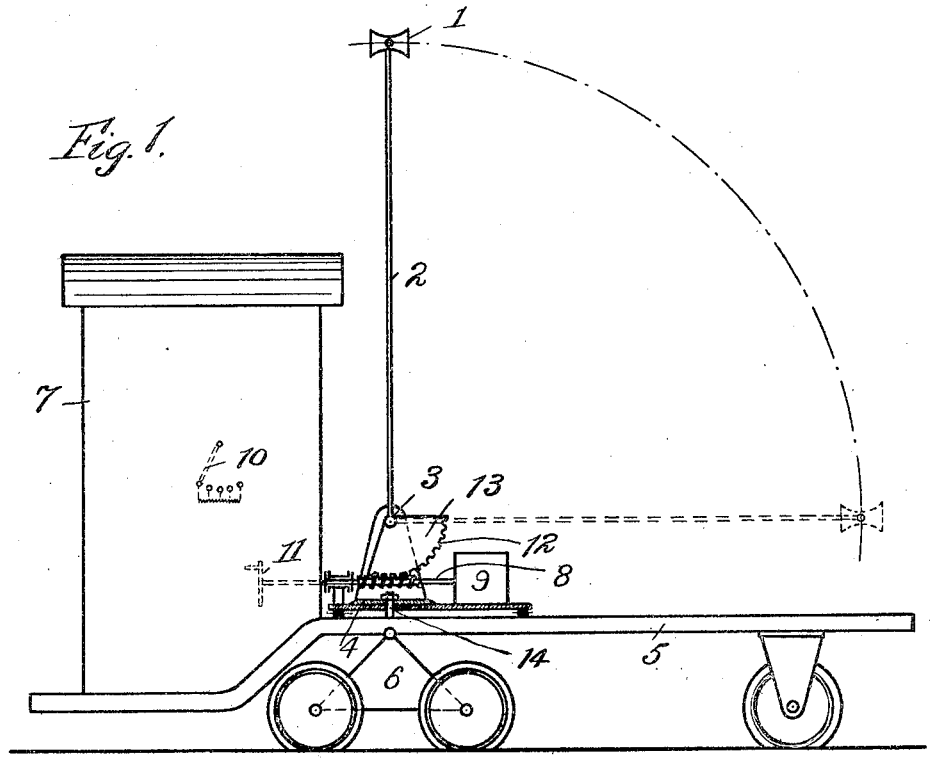
Figure 2:
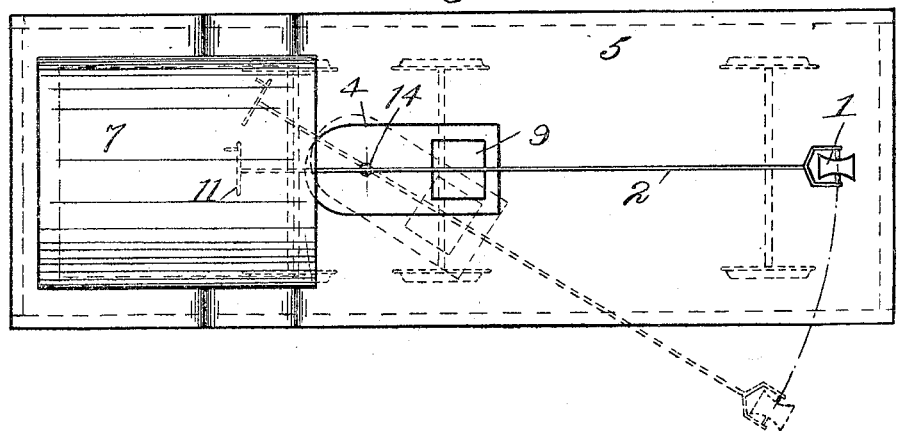

Figure 1 is a diagrammatic elevational view of a locomotive equipped with my improved tow-line guide, and Fig. 2 is a similar plan view of the same.

In a tow-line guide constructed in accordance with the present invention a tow-guide proper, 1, consisting of either a tube or roller, herein shown as a tube and adapted to receive the tow-line, is mounted at the end of a supporting-arm 2, pivoted at 3 and movable in a vertical plane. The support 4 of the arm 2 may be located at any place on the locomotive-frame 5, but is shown in the drawings located at the forward truck of two axles, above the axles and in the neighborhood of the center of gravity.

In order that the arm 2 may be adjusted from the engineer's cab 7 to suit the conditions of travel, a spindle 8 is provided which is operated by a motor 9, controlled by a switch 10 in the engineer's cab 7. The spindle 8 may also be operated by a hand-wheel 11 and connections in the engineer's cabin 7, if desired. The spindle 8 is to be connected to arm 2 by a self-stopping gear to prevent automatic movement of the arm 2, for instance, by a worm-gear 12 and a toothed segment 13, mounted on the pivot 3 to turn with the arm 2, such segment 13 engaging the worm-gear 12, Fig. 1.

The pivot 3, with support 4, and motor 9, with gear 12, may be rotatably mounted on the vertical pivot 14 so that the direction of arm 2 may be adjusted to conform to the direction of the tow-line, Fig. 2.

In operation of the device the engineer within his cab 7 manipulates the hand-wheel 11 or the switch 10, which starts motor 9 in either direction desired to raise or lower arm 2 through means of worm-gear 12 and segment 13, the automatic stop preventing automatic movement of the same and holding the parts in adjusted positions.

I am aware that a guide-arm for cables has heretofore been mounted upon a horizontal pivot; but such arms have been used as guides for electric cables and are not used for draft purposes and cannot be adjusted to varying levels.

Having thus described my invention, the following is what I claim as new therein and desire to secure by Letters Patent:

1. A tow-line guide for towing locomotives comprising a horizontally-pivot supporting-arm, in combination with means operated from the cab of the locomotive for elevating and lowering said arm.

2. A tow-line guide for towing locomotives comprising a horizontally-pivot supporting-arm, a segment mounted to rotate said arm, a self-stopping worm-gear engaging said segment and means controlled in the cab of the locomotive for operating said worm.

3. A tow-line guide for towing locomotives comprising a pivoted arm, a rotatable support for said arm, and means controlled from the cab of the locomotive for operating said arm.

4. A tow-line guide for towing locomotives comprising a pivoted arm, a segment connected to move therewith, a self-stopping worm-gear meshing with said segment, a motor for operating said worm and means for controlling the motor from the locomotive-cab.

GEORG MEYER.

Witnesses:
    WOLDEMAR HAUPT,
    HENRY HASPER.